(12) United States Patent
Toyama

(10) Patent No.: US 6,792,135 B1
(45) Date of Patent: Sep. 14, 2004

(54) SYSTEM AND METHOD FOR FACE DETECTION THROUGH GEOMETRIC DISTRIBUTION OF A NON-INTENSITY IMAGE PROPERTY

(75) Inventor: Kentaro Toyama, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/430,560

(22) Filed: Oct. 29, 1999

(51) Int. Cl.[7] .................................................. G06K 9/00
(52) U.S. Cl. ........................ 382/118; 725/10; 382/173; 382/199
(58) Field of Search ................................ 382/118, 209, 382/199, 195, 191, 173; 725/10

(56) References Cited

U.S. PATENT DOCUMENTS

| | | | | |
|---|---|---|---|---|
| 5,430,809 A | * | 7/1995 | Tomitaka | 382/173 |
| 5,642,431 A | * | 6/1997 | Poggio et al. | 235/380 |
| 5,715,325 A | * | 2/1998 | Bang et al. | 382/118 |
| 5,835,616 A | * | 11/1998 | Lobo et al. | 382/115 |
| 5,852,669 A | * | 12/1998 | Eleftheriadis et al. | 382/118 |
| 6,044,168 A | * | 3/2000 | Tuceryan et al. | 382/118 |
| 6,188,777 B1 | * | 2/2001 | Darrell et al. | 382/103 |
| 6,301,370 B1 | * | 10/2001 | Steffens et al. | 342/90 |
| 6,408,109 B1 | * | 6/2002 | Silver et al. | 382/300 |
| 6,463,176 B1 | * | 10/2002 | Matsugu et al. | 382/195 |
| 6,526,161 B1 | * | 2/2003 | Yan | 382/118 |
| 6,633,655 B1 | * | 10/2003 | Hong et al. | 382/118 |

OTHER PUBLICATIONS

Lee et al. "An Integrated Elastic Contour Fitting and Attribute Graph Matching Model for Automatic Face Coding and Recognition" Aug. 31–Sep. 1, 1999, 1999 Third International Conference on Knowledge–Based Intelligent Information Engineering Systems.*

Yow et al. "Feature–Based Human Face Detection" Aug. 1996, University of Cambridge Department of Engineering, Trumpington Street, Cambridge CB2 1PZ, England.*

Face Detection and Facial Feature Extraction Using Color, Shape and Symmetry–Based Cost Functions.*

Garcia et al. "Face Detection Using Quantized Skin Color Regions Merging and Wavelet Packet Analysis." Sep. 1999. IEEE Transactions On Multimedia. vol. 1 No. 3.*

(List continued on next page.)

*Primary Examiner*—Bhavesh M. Mehta
*Assistant Examiner*—Aaron Carter
(74) *Attorney, Agent, or Firm*—Lyon & Harr, L.L.P.; Craig S. Fischer

(57) ABSTRACT

The present invention is embodied in a system and method for detecting a face within an image using a relational template over a geometric distribution of a non-intensity image property. In general, the system of the present invention includes a hypothesis module for defining a sub-region in which to search for a face, a feature extraction module for extracting image feature values image based on a non-intensity image property, an averaging module for grouping the extracted image feature values into geometrically distributed facial regions, and a relational template module that uses a relational template and facial regions to determine whether a face has been detected. In a preferred embodiment the image property used is edge density, although other suitable properties (such as pixel color) may also be used. The method of the present invention includes performing feature extraction on the image based on an image property (such as edge density), grouping extracted image feature values into facial regions and using a relational template to determine whether a face has been detected.

39 Claims, 9 Drawing Sheets

OTHER PUBLICATIONS

Abde–Mottaleb et al. "Face Detection in Complex Enviroments from Color Images." 1999. IEEE.*

Dai et al. "Extraction of Facial Images from a Complex Background Using SGLD Matrices." 1994. IEEE.*

Kondo T et al.: "Automatic human face detection and recognition under non–uniform illumination", *Pattern Recognition*, U.S., Pergamon Press Inc., Elmsford, N.Y., vol. 32, No. 10, Oct. 1999 1999–10), pp. 1707–1718, XP004171576, ISSN: 0031–3203.

Yang, G et al.: "Human face detection in a complex background", *Pattern Recognition*, U.S., Pergamon Press Inc., Elmsford, N.Y., vol. 27, No. 1, 1994, pp. 53–63, XP000440392, ISSN: 0031–3203.

H. A. Rowley, S. Baluja and T. Kanade, "Neural network-based face detection", in *IEEE Transactions on Pattern Analysis and Machine intelligence*, vol. 20, No. 1, pp. 23–38, Jan. 1998.

H. Schneiderman and T. Kanade, "Probabilistic modeling of local appearance and spatial relationships for object recognition", in *Proc. Conf. on Computer Vision and Pattern Recognition*, pp. 45–51, 1998.

K. K. Sung and T. Poggio, "Example–based learning for view–based human face detection", in *IEEE Transactions on Pattern Analysis and Machine Intelligence*, vol. 20, No. 1, pp. 39–51, Jan. 1998.

* cited by examiner

| i \ j | 1 | 2 | 3 | 4 | 5 | 6 | 7 |
|---|---|---|---|---|---|---|---|
| 1 |  | 0 | +1 | -1 | 0 | 0 | -1 | -1 |
| 2 |  |  | 0 | 0 | +1 | +1 | 0 | 0 |
| 3 |  |  |  | 0 | +1 | +1 | 0 | 0 |
| 4 |  |  |  |  | 0 | 0 | -1 | -1 |
| 5 |  |  |  |  |  | 0 | -1 | -1 |
| 6 |  |  |  |  |  |  | 0 | 0 |
| 7 |  |  |  |  |  |  |  | 0 |

SYSTEM AND METHOD FOR FACE DETECTION THROUGH GEOMETRIC DISTRIBUTION OF A NON-INTENSITY IMAGE PROPERTY

TECHNICAL FIELD

The present invention relates in general to object detection and more particularly to a system and a method for detecting a face within an image using a relational template over a geometric distribution of a non-intensity image property.

BACKGROUND OF THE INVENTION

Determination of the location and size of a human face within an image, or face detection, is a critical part of many computer vision applications. Face detection is an important first step for many types of machine vision systems (such as an automatic face recognition and interpretation system) because a face must first be detected before any further processing (such as recognition and interpretation) can occur. Thus, accurate and reliable face detection is a crucial foundation for higher processing of a face image.

Face detection is used in diverse applications such as systems that index and search image databases by content, surveillance and security systems, vision-based interfaces and video conferencing. Once a face has been detected by a face detection system the resulting face image may be used in several ways. For instance, a system that identifies and recognizes a person by their face (known as face recognition) can be used to detect and recognize a user's face when they sit in front of a computer. This system could then use the person's face as a substitute for a password and automatically provide the user with the user's preferred workspace environment. A detected face can also be examined to interpret the facial expression (known as face interpretation). Facial expression is a non-verbal form of communication that helps determine a person's emotion, intent and focus of attention. For example, eye tracking can be used to determine whether the user is looking at a computer screen and where on the screen the user's eyes are focused.

Each human face, however, is a unique and complex pattern, and detecting faces within an image is a significant problem. This problem includes the difficulty of varying illumination on a face and differences in facial appearance (such as skin color, facial hair and eye color). Some systems attempt to overcome this problem by trying to model (using, for example, neural networks) clusters of variations depending on their occurrence in a training set. These systems, however, often have significant machinery surrounding their basic statistical model and thus require immense amounts of training data to construct a statistical model of facial images.

An alternative approach used by some systems is based on "relational templates" over image intensity values. A relational template is a set of constraints that compares and classifies different regions of an image based on relative values of a regional image property. These types of systems typically contain, for example, a constraint that an eye region (such as the left eye region) must be darker than the cheek region (such as the right cheek region).

Although the relational template approach is sound, one problem with using a relational template over image intensity values is that pixel intensity of an image can vary drastically depending on the lighting conditions and the types of faces. For instance, while some people have dark eyes and light skin other people have light eyes and dark skin. In addition, a face having a thick beard tends to have a dark cheek region, while the same cheek region for a smoothly shaven face appears light. This wide range of possible image intensities can drastically reduce the accuracy and reliability of a face detection system.

Accordingly, there exists a need for a face detection system that utilizes relational templates based on an image property other than image intensity. Further, this face detection system would not require immense amounts of training data for initialization. The face detection system would accurately, efficiently and reliably detect any type of generally upright and forward-facing human face within an image. Whatever the merits of the above-mentioned systems and methods, they do not achieve the benefits of the present invention.

SUMMARY OF THE INVENTION

To overcome the limitations in the prior art as described above and other limitations that will become apparent upon reading and understanding the present specification, the present invention is a system and method for detecting a face within an image using a relational template over a geometric distribution of a non-intensity image property. The present invention provides accurate, efficient and reliable face detection for computer vision systems. In particular, the present invention is especially insensitive to illumination changes, is applicable to faces having a wide variety of appearances and does not require vast amounts of training data for initialization.

In general, the system of the present invention detects a face within an image and includes a hypothesis module for defining an area within the image to be searched, a preprocessing module for performing resizing and other enhancements of the area, a feature extraction module for extracting image feature values based on a non-intensity image property. In a preferred embodiment the image property used is edge density, although other suitable properties (such as pixel color) may also be used. The face detection system also includes a feature averaging module, for grouping image feature values into facial regions, and a relational template module that uses a relational template and the facial regions to determine whether a face has been detected.

The present invention also includes a method for detecting a face in an image using a relational template over a geometric distribution of a non-intensity image property. The method of the present invention includes determining an area of an image to examine, performing feature extraction on the area using on a non-intensity image property (such as edge density), grouping the extracted image feature values into geometrically distributed regions called facial regions, averaging the image feature values for each facial region and using a relational template to determine whether a face has been detected. In addition, the method includes preprocessing the image either before or after feature extraction. Preprocessing may include any suitable image processing operations that enhance the image. Preferably, preprocessing includes a resizing module, for rescaling the image to a canonical image size, and, optionally, an equalization module, for enhancing the contrast of the image.

Other aspects and advantages of the present invention as well as a more complete understanding thereof will become apparent from the following detailed description, taken in conjunction with the accompanying drawings, illustrating by way of example the principles of the invention. Moreover, it is intended that the scope of the invention be limited by the claims and not by the preceding summary or the following detailed description.

BRIEF DESCRIPTION OF THE DRAWINGS

The present invention can be further understood by reference to the following description and attached drawings that illustrate the preferred embodiments. Other features and advantages will be apparent from the following detailed description of the invention, taken in conjunction with the accompanying drawings, which illustrate, by way of example, the principles of the present invention.

Referring now to the drawings in which like reference numbers represent corresponding parts throughout.

DETAILED DESCRIPTION OF THE INVENTION

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. Introduction

The present invention is embodied in a system and method for detecting a face in an image. The present invention uses a relational template over a geometric distribution of a non-intensity image property to detect a face within the image and determine the size and location of the face. Specifically, the present invention generates a hypothesis and defines a sub-region within an image where a face may be located, extracts feature information from that sub-region using a non-intensity image property, groups the feature information into facial regions and uses a relational template to determine whether a face has been detected. In a preferred embodiment, the image property is edge density, which is generally a measure of the total length and strength of edges present in a given area.

The present invention may be used to detect a generally upright face in an image where the face is either directly facing or slightly offset from the camera plane. In particular, some portion of the face must be present for detection. Preferably an entirely forward-facing view of a face is present in an image. The system and method of the present invention are independent of illumination and thus may be used under various lighting conditions. In addition, because the image intensity is not used as the image property, the present invention can be used to detect faces having a wide variety of appearances without requiring lengthy initialization.

II. Exemplary Operating Environment

Figure 1:
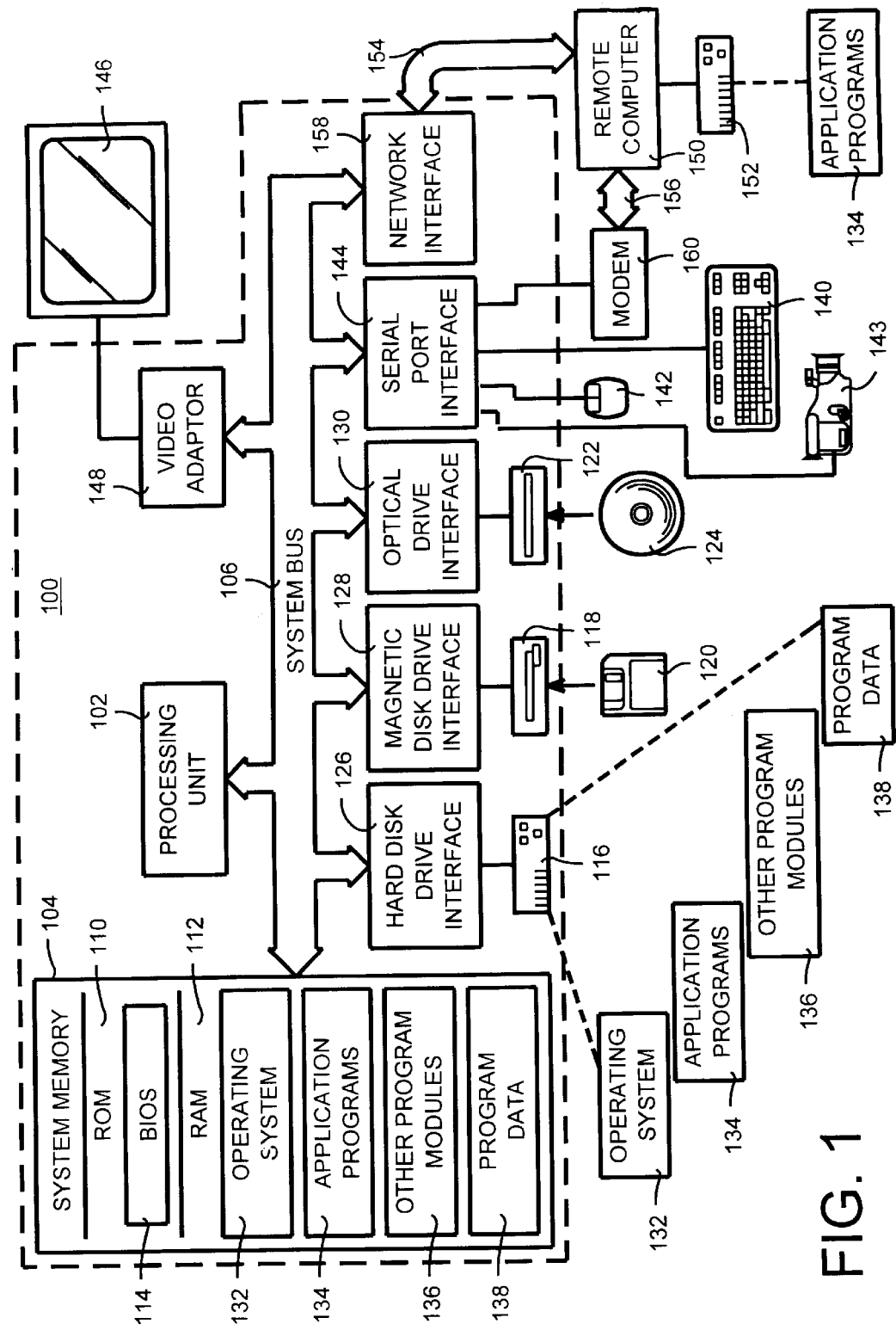
FIG. 1 is a block diagram illustrating an apparatus for carrying out the invention.

FIG. 1 and the following discussion are intended to provide a brief, general description of a suitable computing environment in which the invention may be implemented. Although not required, the invention will be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with a variety of computer system configurations, including personal computers, server computers, hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located on both local and remote computer storage media including memory storage devices.

With reference to FIG. 1, an exemplary system for implementing the invention includes a general-purpose computing device in the form of a conventional personal computer 100, including a processing unit 102, a system memory 104, and a system bus 106 that couples various system components including the system memory 104 to the processing unit 102. The system bus 106 may be any of several types of bus structures including a memory bus or memory controller, a peripheral bus, and a local bus using any of a variety of bus architectures. The system memory includes read only memory (ROM) 110 and random access memory (RAM) 112. A basic input/output system (BIOS) 114, containing the basic routines that help to transfer information between elements within the personal computer 100, such as during start-up, is stored in ROM 110. The personal computer 100 further includes a hard disk drive 116 for reading from and writing to a hard disk, not shown, a magnetic disk drive 118 for reading from or writing to a removable magnetic disk 120, and an optical disk drive 122 for reading from or writing to a removable optical disk 124 such as a CD-ROM or other optical media. The hard disk drive 116, magnetic disk drive 128 and optical disk drive 122 are connected to the system bus 106 by a hard disk drive interface 126, a magnetic disk drive interface 128 and an optical disk drive interface 130, respectively. The drives and their associated computer-readable media provide nonvolatile storage of computer readable instructions, data structures, program modules and other data for the personal computer 100.

Although the exemplary environment described herein employs a hard disk, a removable magnetic disk 120 and a removable optical disk 124, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs), and the like, may also be used in the exemplary operating environment.

A number of program modules may be stored on the hard disk, magnetic disk 120, optical disk 124, ROM 110 or RAM 112, including an operating system 132, one or more application programs 134, other program modules 136 and program data 138. A user (not shown) may enter commands and information into the personal computer 100 through input devices such as a keyboard 140 and a pointing device 142. In addition, a camera 143 (or other types of imaging devices) may be connected to the personal computer 100 as well as other input devices (not shown) including, for example, a microphone, joystick, game pad, satellite dish, scanner, or the like. These other input devices are often connected to the processing unit 102 through a serial port interface 144 that is coupled to the system bus 106, but may be connected by other interfaces, such as a parallel port, a game port or a universal serial bus (USB). A monitor 146 or other type of display device is also connected to the system bus 106 via an interface, such as a video adapter 148. In addition to the monitor 146, personal computers typically include other peripheral output devices (not shown), such as speakers and printers.

The personal computer 100 may operate in a networked environment using logical connections to one or more remote computers, such as a remote computer 150. The remote computer 150 may be another personal computer, a server, a router, a network PC, a peer device or other common network node, and typically includes many or all of the elements described above relative to the personal computer 100, although only a memory storage device 152 has been illustrated in FIG. 1. The logical connections depicted in FIG. 1 include a local area network (LAN) 154 and a wide area network (WAN) 156. Such networking environments are commonplace in offices, enterprise-wide computer networks, intranets and the Internet.

When used in a LAN networking environment, the personal computer 100 is connected to the local network 154 through a network interface or adapter 158. When used in a WAN networking environment, the personal computer 100 typically includes a modem 160 or other means for establishing communications over the wide area network 156, such as the Internet. The modem 160, which may be internal or external, is connected to the system bus 106 via the serial port interface 144. In a networked environment, program modules depicted relative to the personal computer 100, or portions thereof, may be stored in the remote memory storage device 152. It will be appreciated that the network connections shown are exemplary and other means of establishing a communications link between the computers may be used.

III. General Overview

As shown in FIGS. 2–11 for the purposes of illustration, the invention is embodied in a system and a method for a system for detecting a face within an image using a relational template over a geometric distribution of an image property. This image property may be any property of the image other than intensity, such as, for example, edge density or color. Using an image property other than image intensity alleviates problems arising from intensity variations due to lighting conditions or facial features.

Figure 2:
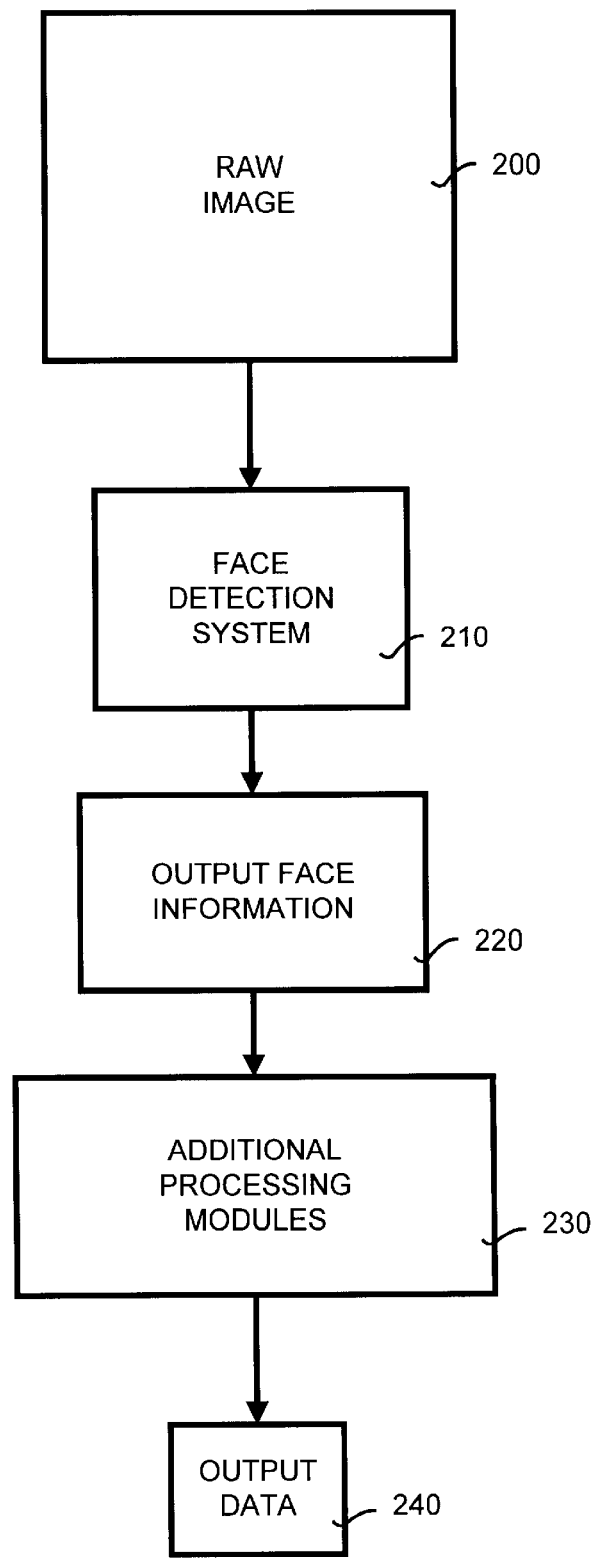
FIG. 2 is an overall block diagram of a computer vision system incorporating the present invention.

FIG. 2 is an overall block diagram of a computer vision system incorporating the present invention. This computer vision system is only one example of several types of systems that could incorporate the face detection system of the present invention. In general, the input to the computer vision system is an unprocessed image or raw image 200 that may contain a human face. The raw image 200 may be obtained from a storage device (such as a hard drive or an optical disk) or live from a still or video camera.

The raw image 200 image is received by a face detection system 210 of the present invention that searches for and detects any faces present in the raw image 200. As explained in detail below, a hypothesis is generated for where in the image 200 to search for a face and a sub-region is subsequently defined. The raw image 200 is preprocessed, information about any features present in the image 200 are extracted based on an image property and a relational template is used to determine whether a human face has been detected. Face information 220, which includes a face image and the location and dimensions (or size) of the sub-region containing the face, is then transmitted from the face detection system 210 to additional processing modules 230 that output relevant data 240 from the modules 230. The additional processing modules 230 can include, for example, face identification and recognition modules (which may form a part of a computer vision security system) and face interpretation and tracking modules (which may be part of a vision-based computer interface system).

Figure 3:
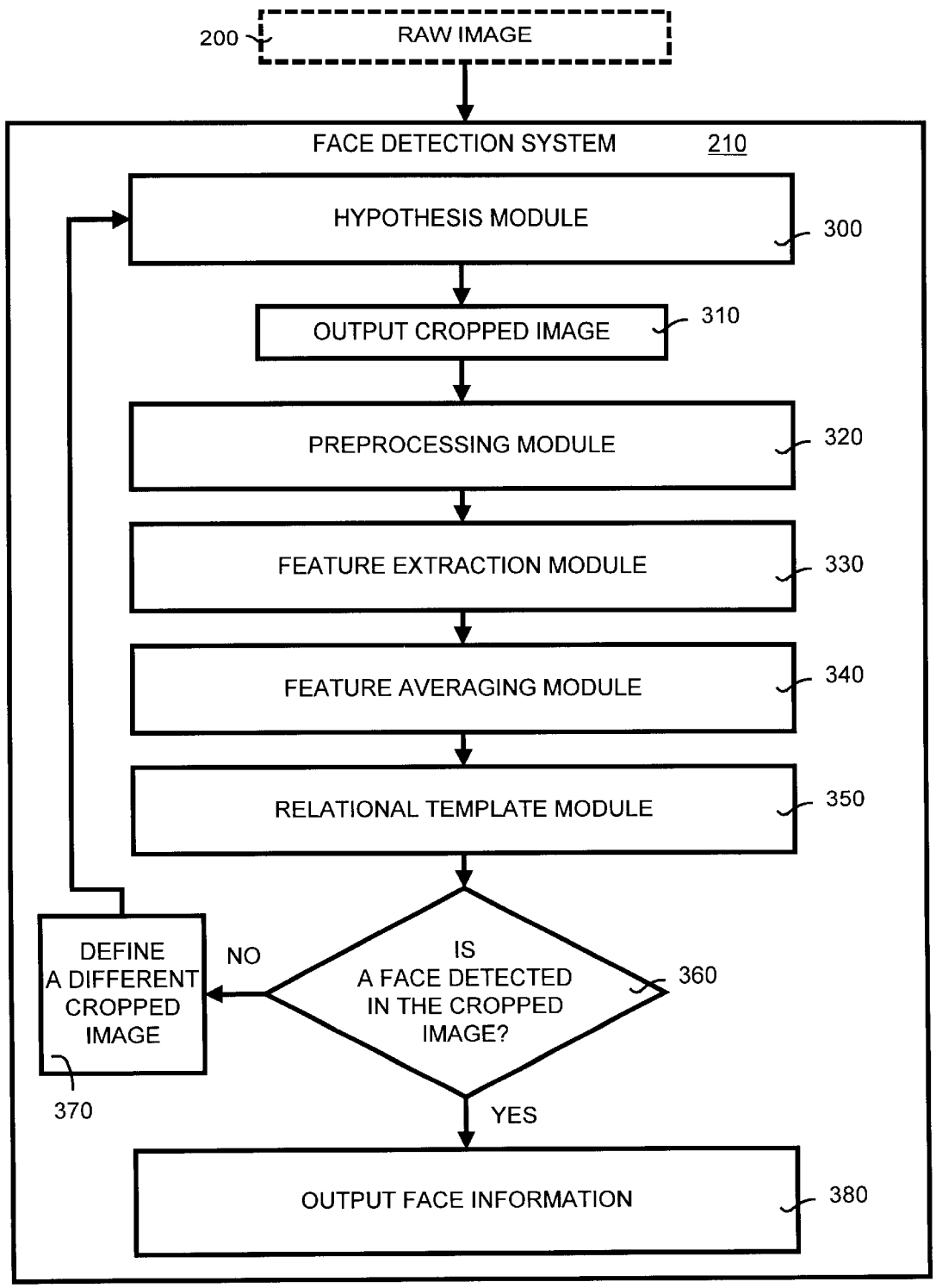
FIG. 3 is a general block-flow diagram illustrating the face detection system of the present invention.

FIG. 3 is a general block-flow diagram illustrating the face detection system shown in FIG. 2. Generally, the face detection system 210 of the present invention inputs an image to be examined, determines a sub-region of the image to examine, performs preprocessing on the sub-region, performs feature extraction based on image property and uses a relational template to determine if a face is present in the sub-region. The raw image 200 is received by the face detection system 210 and sent to a hypothesis module 300 that generates a hypothesis and defines the dimensions of a sub-region in the raw image 200 (or cropped image) where a face may be found. The cropped image is sent as output (box 310) to a preprocessing module 320, which prepares the raw image 200 for further processing. The preprocessed cropped image is then sent to a feature extraction module 330.

The feature extraction module 330 extracts any facial features present in the preprocessed cropped image by using a feature template based on an image property. Further, image features values are obtained by the feature extraction module 330 and sent to a feature averaging module 340. The feature averaging module 340 determines a number of facial regions, places the image features values into a facial regions and determines a combined image feature value for each facial region. The combined values are then sent to a relational template module 350 that builds a relational table and determines a relational value based on each region's combined image feature value.

Based a comparison between the relational value and a threshold value, the system 210 determines whether a face has been detected in the cropped image (box 360). If not, then a face is not within in the sub-region that was examined and a different sub-region needs to be generated (box 370). This occurs by returning to the hypothesis module 300 where a different hypothesis is generated about where a face may be located within the image 200. In addition, based on the hypothesis generated a different cropped image is defined for examination as described previously. If a face is detected in the cropped image then face information is sent as output (box 380). Face information includes, for example, a image of the face, the location of the face within the image 200, and the location and dimensions of the cropped image where the face was found.

IV. System and Operational Details

Figure 4:
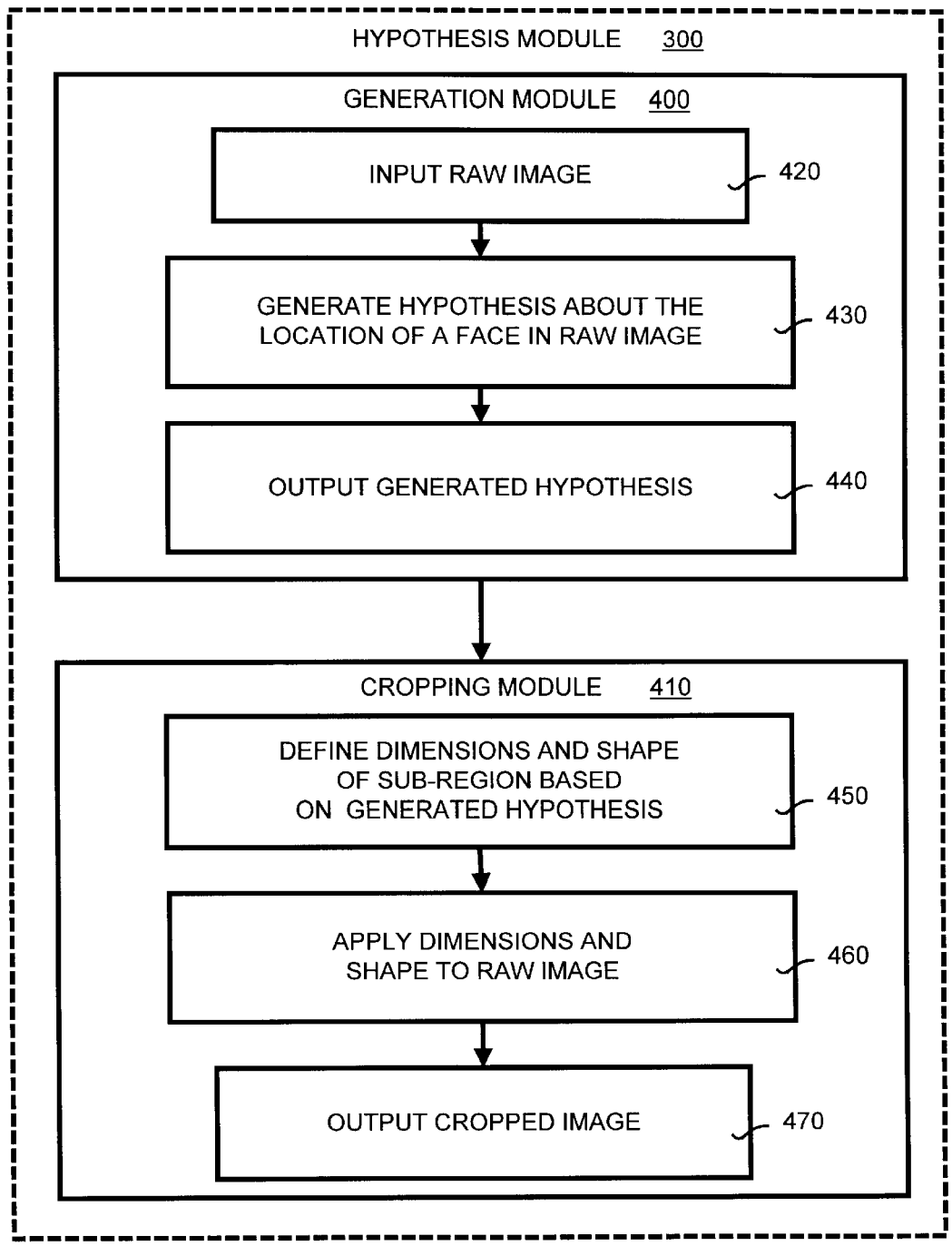
FIG. 4 is a detailed block diagram illustrating the hypothesis module of the face detection system shown in FIG. 3.

FIG. 4 is a detailed block diagram illustrating the hypothesis module of the face detection system shown in FIG. 3. Generally, the hypothesis module 300 generates an assumption as to the location of a face within the raw image 200 and defines the dimensions of a sub-region (within the image 200) in which to look for a face. The hypothesis module 300 includes a generation module 400, for generating a hypothesis about where a face may be located, and a cropping module 410, for defining a sub-region to examine.

The generation module 400 receives raw image (box 420) and generates a hypothesis about the location of a face in the raw image (box 430). The hypothesis may include, for example, information about which image scales, aspect ratios and locations to examine. In a preferred embodiment of the invention, hypotheses are generated that include rectangular sub-regions of the image within a range of scales and at all possible image locations. Alternatively, hypothesis generation may include other types of vision processing that target regions of the image most likely to contain a face (such as regions of the image that contain skin color or ellipse-shaped blobs). The generated hypothesis is then sent as output (box 440) to the cropping module 410.

The cropping module 410 then defines the dimensions and shape of a sub-region (or cropped image) based on the generated hypothesis (box 450). The dimensions and shape are applied to the raw image (box 460) and a cropped image is sent as output (box 470). It should be noted that the dimensions of the sub-region range between a small percentage of the raw image to the entire raw image. Further, in a preferred embodiment of the invention, the shape of the sub-region is rectangular. Alternatively, the sub-region may be any suitable shape that facilitates detection of a face within the sub-region (such as oval, circular or square). Preferably, once the dimensions and shape of the sub-region are defined, the entire image is searched by cycling each sub-region through the face detection system 210 of the present invention. Examination of each sub-region may occur one sub-region at a time or, if multiple processors are available, concurrent examination may be performed.

Figure 5:
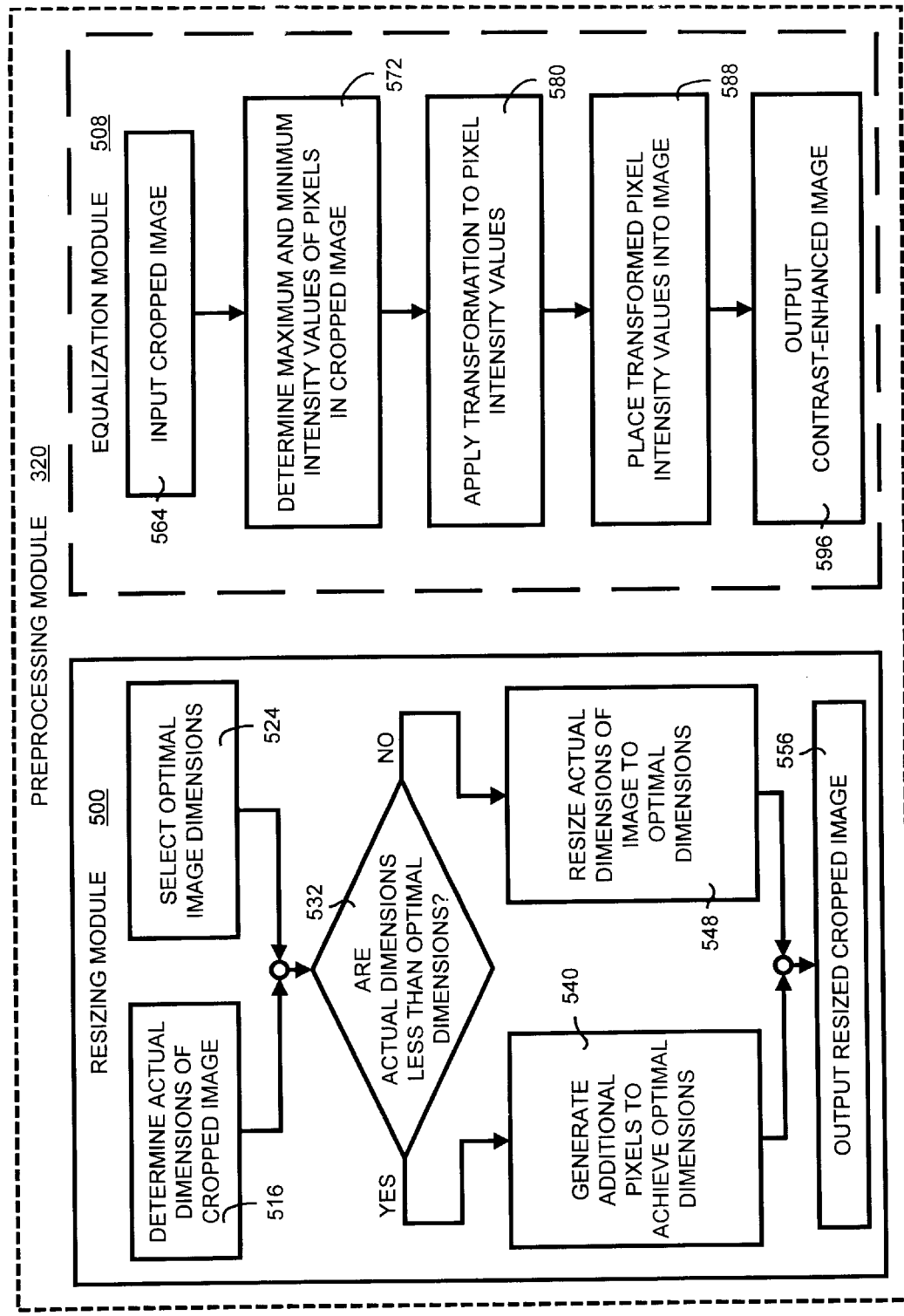
FIG. 5 is a detailed block diagram illustrating the preprocessing module of the face detection system shown in FIG. 3.

FIG. 5 is a detailed block diagram illustrating the preprocessing module 320 of the face detection system 210 shown in FIG. 3. The preprocessing module 320 receives the cropped image that may contain a face and performs various types of preprocessing. This preprocessing includes resizing the image, masking the image to filter out unwanted background noise, performing histogram equalization on the image, or any other type of preprocessing that will enhance the raw image for further processing by the face detection system 210 of the present invention.

In general, the preprocessing module 320 can include several types of modules for performing the preprocessing listed above. In a preferred embodiment, the preprocessing module includes a resizing module 400 for resizing the cropped image. Moreover, an equalization module 508 for increasing image contrast may optionally be included in a preferred embodiment (as shown by the large dashed line around the equalization module 508 in FIG. 5). It should be noted that processing of the cropped image by these modules can occur in any suitable order. In the following description, however, the resizing module 500 is discussed first.

The resizing module 500 resizes the cropped image to an optimal (or canonical) size using such methods as, for example, smoothing, downsampling and pixel interpolation. This resizing reduces the effects of image resolution and scale that can substantially change qualities of an image. The resizing module 500 shown in FIG. 5 uses pixel interpolation, but it should be understood that any other suitable method of resizing an image (such as those listed above) may be used. In a preferred embodiment, the resizing module 500 begins processing a cropped image by determining the actual dimensions (such as horizontal and vertical) of the image (box 516). In addition, a set of optimal dimensions for the image is selected (box 524). A comparison then is made to determine whether the actual dimensions are less than the optimal dimensions (box 532). If the actual dimensions are less, then additional pixels are generated and added to the actual dimensions to achieve the optimal dimensions (box 540). In a preferred embodiment, additional pixels are generated using linear (if one dimension is too small) or bilinear (if both dimensions are too small) interpolation. If the actual dimensions are greater than the optimal dimensions, then the actual dimensions are resized to achieve the optimal dimensions (box 548). Preferably, this resizing is performed using Gaussian smoothing and downsampling. A resized image having optimal dimensions is then sent as output (box 556).

The optional equalization module 508 receives the cropped image (box 564) and determines a maximum and a minimum of each pixel's intensity value within the cropped image (box 572). A transformation is applied to the intensity value of each pixel (box 580) and the transformed pixel intensity values placed back into the image (box 588). Preferably, this transform is a histogram equalization that applies a linear transformation on each pixel intensity value in the image, such that the resulting image spans the full range of grayscale values. For example, each pixel value p is transformed to p'=ap+b, where a and b are chosen so that one of the pixels assumes the maximum possible grayscale value while another pixel assumes the minimum value, and all others fall in between. The values for a and b are held constant for any given input image. After all pixels are transformed, the resulting contrast-enhanced image is sent as output (box 596).

Figure 6:
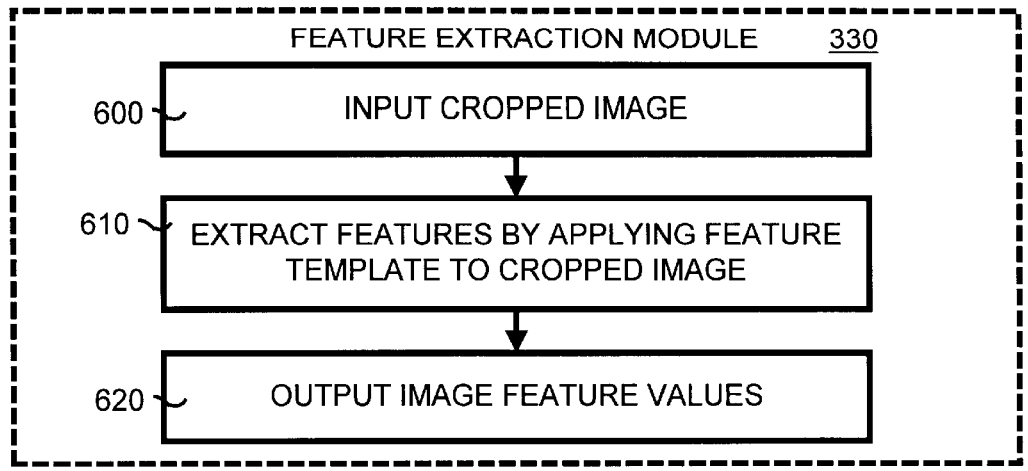
FIG. 6 is a detailed block diagram illustrating the feature extraction module of the face detection system shown in FIG. 3.

FIG. 6 is a detailed block diagram illustrating the feature extraction module 330 of the face detection system 210 shown in FIG. 3. The feature extraction module 330 uses a non-intensity image property to detect local features present in the image. The non-intensity image property is used in a feature template that, in a preferred embodiment, is sensitive to high spatial frequencies. A cropped image is received as input (box 600) and, for each pixel within the cropped image, image feature values based on the non-intensity image property are extracted (box 610) and sent as output (box 620). The image feature values are extracted by using the feature template to determine the degree of high-frequency variation that occurs around each pixel. In a preferred embodiment, the image property is edge density. Edge density is the amount of local high-frequency texture within an area of the face. For example, high edge density is normally found around the eyes, where facial features such as the limbus, the eyelids and the eyelashes project several edges onto the image. In contrast, areas of the face such as the cheeks contain few edges and thus have low edge density. This low edge density occurs whether the cheeks are smooth shaven or covered by facial hair.

In a preferred embodiment, convolution is used to convolve the preprocessed image with at least one feature template based on edge density (known as a texture template). The output of the convolution is high in areas where there are many edges and low in areas where there are not. Preferably, edge detection is performed using an edge mask (such as a 1, 0, −1 edge mask) applied both horizontally and vertically. For each pixel, the extracted information includes a maximum value of the absolute values of each respective convolution. Alternatively, other means of extracting image property information from an image (i.e. feature templates) other than convolution may be used, such as, for example, Laplacians, Gabor wavelets, and any other types of filters than can act as detectors of high-frequency components in an image.

Figure 7:
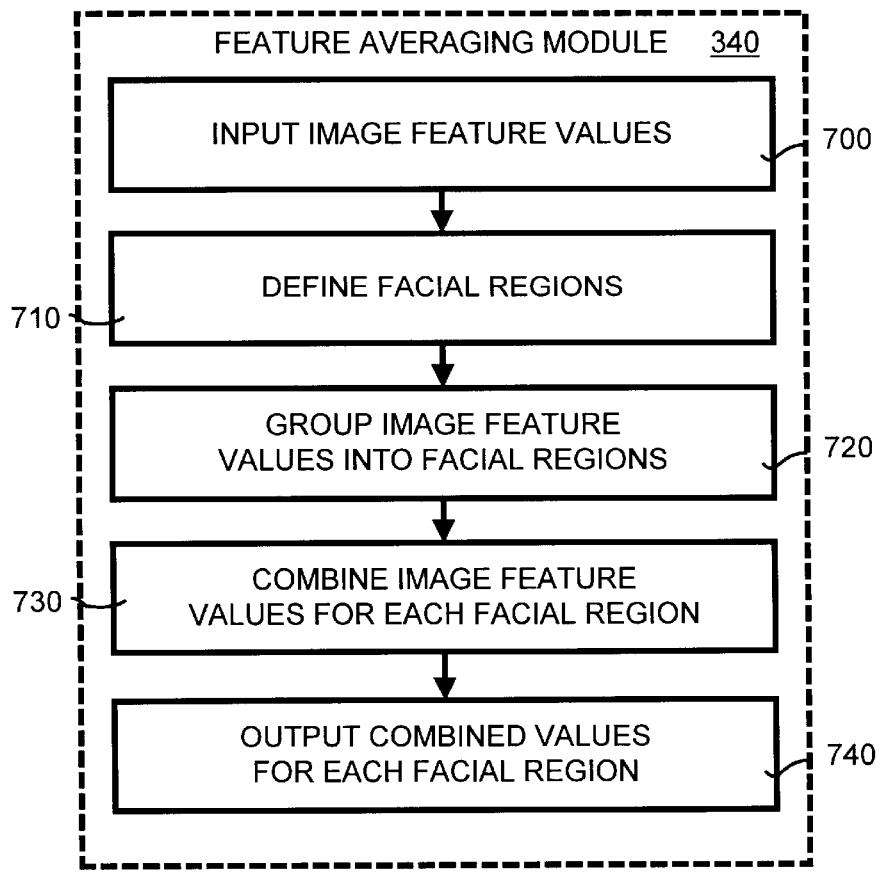
FIG. 7 is a detailed block diagram illustrating the feature averaging module shown in FIG. 3.

FIG. 7 is a detailed block diagram illustrating the feature averaging module shown in FIG. 3. The feature averaging module 340 defines facial regions and combines (e.g., averages or otherwise aggregates and summarizes) the image feature values within each facial region. Preferably, each facial region corresponds to a feature on a face and the facial regions are geometrically distributed in a facial arrangement (i.e., according to how features of a face are arranged). For example, a forehead region would be above a right eye region and a left eye region and a mouth region would be below a nose region. In addition, the number of facial regions can be any number including one or greater. For example, in a preferred embodiment the number of facial features is seven, corresponding to forehead, right eye, left eye, right cheek, left cheek, nose and mouth regions.

The feature averaging module 340 inputs the image feature values (box 700) and defines facial regions (box 710). The image feature values are then grouped into corresponding facial regions (box 720) and all of the image property values for each facial region are combined (box 730). Preferably, the image property values for each facial region are averaged. For instance, if the image property is edge density and there are eighteen pixels within a right eye region, that region might be represented by an average texturedness value of the eighteen pixels. A combined image feature value for each facial region is sent as output (box 740).

Figure 8:
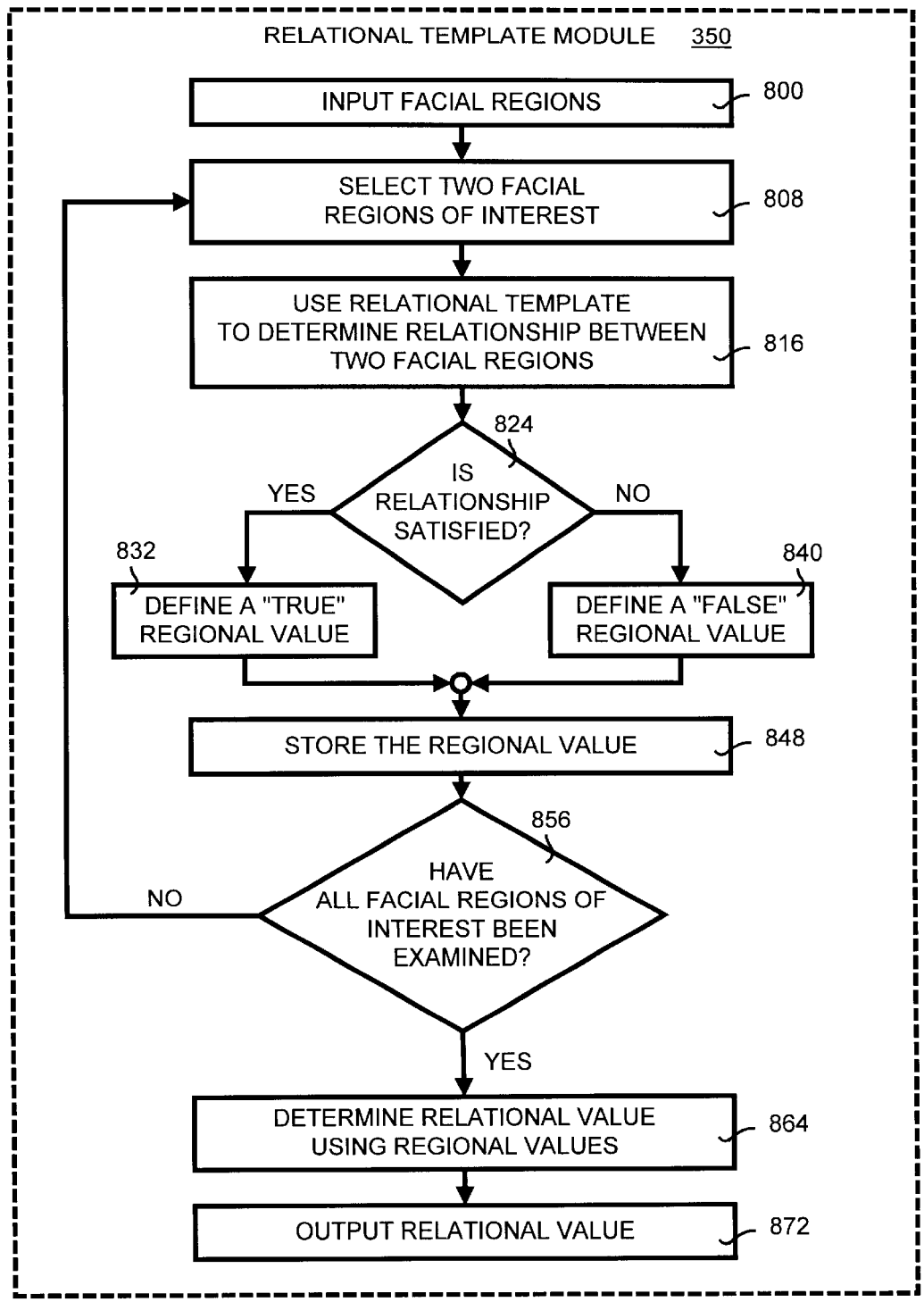
FIG. 8 is a detailed block diagram illustrating the relational template module shown in FIG. 3.
Figures 9, 10:
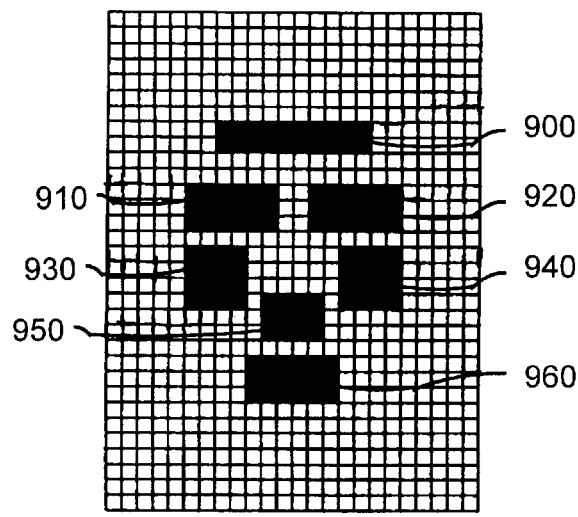
FIG. 9 illustrates an exemplary example of facial regions used in the present invention.
FIG. 10 is a working example of a relational template over edge density that is used in the present invention.

FIG. 8 is a detailed block diagram illustrating the relational template module shown in FIG. 3. In general, the relational template module 350 determines the relationship between any two facial regions and assigns a regional value based on that relationship. Regional values are then summed to yield a relational value and, if the relational value is greater than a threshold, a face has been detected. Specifically, the relational template module 350 inputs the facial regions and combined image feature values (box 800) from the feature averaging module 340. Two facial regions of interest are selected (box 808) and, using a relational template, a relationship is determined between the two facial regions (box 816). The relational template is generally a matrix (an example of which is shown in FIG. 10) that is fixed throughout the face detection operation. The relational template module 350 then determines whether the relationship between the two facial regions is satisfied (box 824). For instance, a relationship may be that a forehead region must have a lower edge density than a left eye region.

If the relationship is satisfied, a "true" regional value is defined (box 832); otherwise, a "false" regional value is defined (box 840). For example, if the forehead region has a lower edge density than the left eye region the relationship is satisfied and the regional value would be +1 (or "true"). Otherwise, the regional value would be −1 (or "false"). The regional value associated with the relationship between the two facial regions is then stored (box 848). The relational template module 350 then determines whether all of the facial regions of interest have been examined (box 856). If all the regions have not been examined, the relationship between two different facial regions is examined. Otherwise, a relational value is determined using the stored regional values (box 864). Preferably, the relational value is determined by summing the regional values. For example, if five relationships are satisfied (+1*5=5) and two relationships are not satisfied (−1*2=−2) the relational value would be equal to three (5+(−2)=3).

The relational value is sent as output (box 872) to be compared to a threshold value (see FIG. 3). If the relational value is greater than a certain empirically-determined threshold value then a face has been detected within the image. In particular, a face is detected if:

$$\sum_{i,j} sgn(I_i - I_j) t_{ij} > y$$

where $sgn(I_i-I_j)$ returns a+1, 0, or −1 depending on the sign of its argument, y is a threshold determined empirically, and the sum is taken over all possible values of i and j where i<j. In addition, any type of postprocessing directed at improving speed and eliminating redundancies may be performed on the face image at this point. For example, if two faces are detected and overlap by more than a certain amount then a postprocessing module would determine that the two overlapping faces were really one face and merge the two faces into one.

V. Working Example

The following working example is for detecting a human face within an image and is provided for illustrative purposes only. In this working example, the system and method of the present invention preprocesses a cropped input image by resizing to some canonical image size, uses a texture template sensitive to high spatial frequencies over the resized image, averages the pixels comprising each facial feature, and outputs the results of a relational template. A face is detected if the output from the relational template is greater than an empirically-determined threshold. In this working example, the non-intensity image property used is edge density, which is independent of both person and illumination. This working example was performed using an image from a live color video camera that was captured using an image digitizer. The processing of the image was done on a personal computer containing a single-processor 300 MHz Pentium II microprocessor.

In this working example the face detection system and method of the present invention were used first on an entire raw image (so that the cropped image was defined as the entire raw image). Next, smaller sub-regions were defined and searched using the face detection system and method. These sub-regions were defined for a limited range of scales that included only those scales on which a face would be located if the user was sitting in front of a desktop computer. The face detection method, however was performed over the entire image, for every hypothesized rectangle in which a face could appear.

Each cropped image was resized to a canonical image size and the detected features were grouped into seven facial regions. FIG. 9 illustrates these exemplary facial regions used in this working example. In particular, the facial regions includes a forehead region 900 (facial region 1), a right eye region 910 (facial region 2), a left eye region 920 (facial region 3), a right cheek region 930 (facial region 4), a left cheek region 940 (facial region 5), a nose region 950 (facial region 6) and a mouth region 960 (facial region 7). The edge density values in each of these regions were averaged and a relational template was then used.

The relational template is an n×n table that gives the relative values of any two facial regions. In this working example, n=7 because there are seven facial regions. FIG. 10 illustrates the relational template that was used in this working example. Referring to FIG. 10 and the above equation, for an entry in the table, possible values are +1 if $I_i > I_j$ (where $I_i$ is the texturedness value of the $i^{th}$ facial region), −1 if $I_j < I_j$, and 0 if the relational template is indifferent to a relationship (i.e. the relationship is not a relationship of interest). For example, a comparison of the relationship between facial region 3 (the left eye region, i=3) and facial region 4 (the right cheek region, j=4) gives a regional value of +1. This is expected because an eye tends to have a higher edge density than a cheek.

Figure 11A:
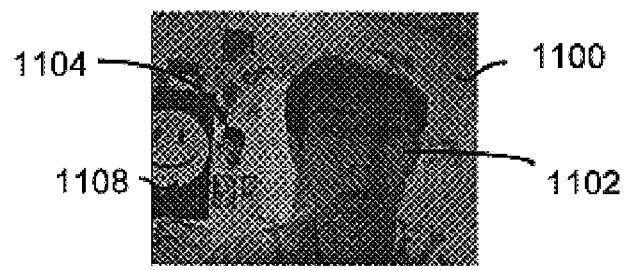
FIG. 11A is a raw image used in a working example of the present invention.
Figure 11B:
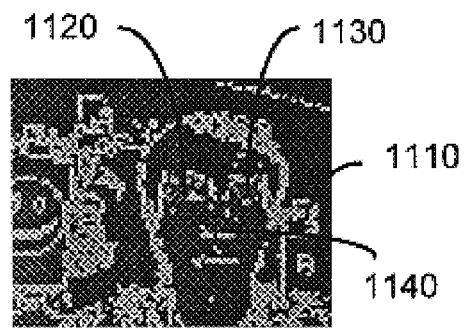
FIG. 11B shows the location of a detected face from the raw image of FIG. 11A.
Figure 11C:
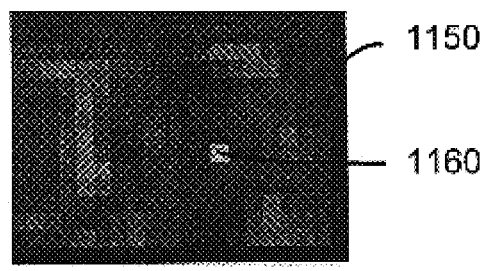
FIG. 11C shows the result of partial region averaging performed on the image of FIG. 11B.

FIG. 11A shows the raw image 1100 used in this working example including a human face to be detected 1102 and other assorted faces such as a photograph of a face in the background 1104 and a drawing of a face 1108. The feature extraction module was used on the image 1100 and FIG. 11B shows result. Specifically, the image 1110 is a thresholded texturedness image containing detected features including a right eye 1120, a left eye 1130 and a nose 1140 (shown by the dots over each of these regions). FIG. 11C shows an image 1150 that is the result of partial region averaging performed on the image 1110 of FIG. 11B. The image 1150 of FIG. 11C shows that the face 1102 has been detected and a dot marks the center of the detected face 1102. It should be noted that the photograph of a face in the background 1104 and the drawing of a face 1108 were not detected because of the scale constraint provided by the hypothesis module.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. A system for detecting a face in an image, comprising:
   a feature extraction module that extracts features from the image using a non-intensity image property;
   a feature template that determines a high-frequency variation around each pixel in the image;
   a feature averaging module that groups the features into facial regions;
   a relational template module that uses a relational template over a geometric distribution of the non-intensity image property; and
   regional values assigned by the relational template module that are based on a relationship between the facial regions and are used to determine whether the face has been detected.

2. The system of claim 1, wherein the non-intensity image property is edge density.

3. The system of claim 1, wherein the feature extraction module extracts features using convolution.

4. The system of claim 3, wherein the feature extraction module further comprises an edge mask for performing edge detection.

5. The system of claim 1, wherein the feature extraction module extracts features using at least one of: (a) Laplacians; (b) Gabor wavelets.

6. The system of claim 1, wherein the feature averaging module combines image feature values for each feature.

7. The system of claim 6, wherein the feature averaging module averages the image feature values for each facial region.

8. The system of claim 1, wherein the relationship between the facial regions is based on the non-intensity image property.

9. The system of claim 8, wherein the relational template is a matrix.

10. The system of claim 1, wherein a relational value is determined using regional values.

11. The system of claim 10, wherein the face is detected if the relational value is greater than a threshold value.

12. The system of claim 1, further comprising a preprocessing module capable of at least one of: (a) resizing the image; (b) masking the image to filter out unwanted background noise; (c) performing histogram equalization on the image.

13. The system of claim 1, further comprising a hypothesis module that generates a hypothesis about a location of the face in the image and defines a sub-region within the image based on the hypothesis.

14. The system of claim 13, wherein the hypothesis is based at least partially on the non-intensity image property.

15. The system of claim 1, wherein the facial regions are geometrically distributed in a facial arrangement.

16. A method for detecting a face in an image, comprising:
   extracting features from the image using a non-intensity image property;
   determining a high-frequency variation around each pixel in the image;
   grouping the extracted features into facial regions based on a geometric distribution of the non-intensity image property; and
   determining whether a face has been detected in the image by using a relational template over a geometric distribution of the non-intensity property and a relationship between the facial regions.

17. The method of claim 16, wherein the non-intensity image property is edge density.

18. The method of claim 16, wherein the facial regions are geometrically distributed in a facial arrangement.

19. The method of claim 16, wherein the feature template is sensitive to high spatial frequencies.

20. The method of claim 19, wherein extracting further comprises extracting at least one image feature value for each feature.

21. The method of claim 20, wherein the feature template is a texture template that uses edge density.

22. The method of claim 19, wherein extracting further comprises using convolution to convolve the image with the feature template.

23. The method of claim 19, wherein extracting further includes using at least one of: (a) Laplacians: (b) Gabor wavelets.

24. The method of claim 20, grouping further comprises combining image feature values for each feature.

25. The method of claim 16, wherein the relationship between the facial regions is based on the non-image property.

26. The method of claim 16, further comprising assigning a regional value for each of the facial regions based on the relationship.

27. The method of claim 26, further comprising defining a relational value based on the regional values.

28. The method of claim 27, wherein determining further comprises detecting the face if the relational value is greater than a threshold value.

29. The method of claim 16, further comprising:
   generating a hypothesis about the location of the face within the image; and
   defining a sub-region within the image to search for the face.

30. The method of claim 29, wherein the hypothesis is based on at least one of: (a) a scale; (b) an aspect ratio; (c) a location in the image.

31. The method of claim 29, wherein the hypothesis is based at least partially on the non-intensity image property.

32. The method of claim 16, further comprising preprocessing the image.

33. The method of claim 16, wherein preprocessing comprises at least one of: (a) resizing the image; (b) filtering out unwanted noise from the image; (c) performing histogram equalization on the image.

34. A method for detecting a face in an image, comprising:
   extracting features from the image using a non-intensity image property and a feature template to determine high-frequency variation around each pixel of the image;
   placing the features into facial regions;
   using a relational template over a geometric distribution of the non-intensity property to determine a relationship between the facial regions;
   defining a relational value based on the relational template; and
   detecting a face within the image if the relational value is greater than a threshold value;
   wherein the non-intensity image property includes at least one of: (a) edge density; (b) pixel color.

35. The method of claim 34, further comprising using information about the detected face in a computer vision system.

36. The method of claim 35, wherein the computer vision system is used to interpret the information about the detected face.

37. The method of claim 35, wherein the computer vision system is used to recognize the detected face.

38. A computer-implemented method for deciding whether a face is present in a image, comprising:
   generating an hypothesis as to a location in the image where a face may be present;
   defining a sub-region in the image based on the generated hypothesis;
   extracting image feature values based on a non-intensity image property for each pixel in the sub-region using a feature template that is sensitive to high frequencies to determine the degree of high-frequency variation around each pixel in the sub-region;
   defining facial regions in the sub-region of the image;
   combining each of the image feature values in each of the facial regions to obtain a combined feature value for each of the facial regions;
   determining a relationship between any two of the facial regions and assigning a regional value based on the relationship;
   summing the regional values to obtain a relational value; and
   comparing the relational value to a threshold value to decide whether a face is present in the image.

39. The computer-implemented method as set forth in claim 38, wherein the generated hypothesis comprises information about at least one of: (a) images scales; (b) aspect ratios; (c) image locations; (d) target regions of the image obtained by using vision processing techniques.

* * * * *